United States Patent [19]

Shimizu et al.

[11] Patent Number: 4,933,399
[45] Date of Patent: Jun. 12, 1990

[54] METHOD OF PREVENTING POLYMER-SCALE FORMATION

[75] Inventors: Toshihide Shimizu, Urayasu; Ichiro Kaneko, Hazakimachi; Mikio Watanabe, Kamisumachi, all of Japan

[73] Assignee: Shin-Etsu Chemical Co., Ltd., Tokyo, Japan

[21] Appl. No.: 281,039

[22] Filed: Dec. 7, 1988

[30] Foreign Application Priority Data

| Dec. 8, 1987 | [JP] | Japan | 62-311528 |
| Aug. 10, 1988 | [JP] | Japan | 63-199122 |
| Aug. 10, 1988 | [JP] | Japan | 63-199123 |
| Aug. 24, 1988 | [JP] | Japan | 63-210341 |
| Aug. 24, 1988 | [JP] | Japan | 63-210342 |

[51] Int. Cl.$^5$ ............................ C08F 2/12; B05D 1/38
[52] U.S. Cl. ...................................... 526/62; 526/74; 526/199; 526/200; 526/210; 526/221; 526/342; 427/230; 427/384; 427/388.1
[58] Field of Search ................ 526/62, 74, 199, 200, 526/210, 221; 427/384, 385.5, 388.1

[56] References Cited

U.S. PATENT DOCUMENTS 3,669,946 6/1972 Koyanagi et al. .................. 526/62
4,272,622 6/1981 Kitamura et al. .................. 526/62

FOREIGN PATENT DOCUMENTS 0096319 12/1983 European Pat. Off. ............. 526/62

Primary Examiner—Joseph L. Schofer
Assistant Examiner—F. M. Teskiu
Attorney, Agent, or Firm—Oblon, Spivak, McClelland, Maier & Neustadt

[57] ABSTRACT

A method of preventing polymer scales from sticking in a polymerization vessel during the polymerization of a monomer having an ethylenically double bond, wherein said polymerization is carried out in a polymerization vessel of which the inner wall and other parts with which said monomer comes into contact during polymerization are previously first coated with (a) a coating solution comprising a cationic dye and the resulting coating is then coated with (b) a coating solution comprising at least one component selected from the group consisting of anionic polymeric compounds, amphoteric polymeric compounds and hydroxyl group-containing organic compounds. Polymer scale formation can be effectively prevented.

9 Claims, No Drawings

METHOD OF PREVENTING POLYMER-SCALE FORMATION

BACKGROUND OF THE INVENTION

1. Field of the Invention

The present invention relates to a method of preventing polymer scales from sticking on the inner wall, etc. of a polymerization vessel during the polymerization of a monomer having an ethylenically double bond.

2. Description of the Prior Art

In processes of preparing polymers by polymerizing monomers in a polymerization vessel, known to arise is the problem that the polymers stick on the inner wall, etc. of the polymerization vessel in the form of scales. Once the scales of polymers stick on the inner wall, etc. of the polymerization vessel, the disadvantages may result such that the yield of the polymers and the cooling capacity of the polymerization vessel are lowered, the sticked scales of polymers may peel to mix into manufactures to bring about a lowering of the quality of manufactured polymers, and also much labor and time are required to remove the scales of polymers.

As methods of preventing polymer scales from sticking on the inner wall, etc. of a polymerization vessel, there have been hitherto proposed, for example, a method in which a polar compound, a dye, a pigment or the like is coated on the inner wall (Japanese Patent Publication (KOKOKU) No. 30343/1970 and No. 30835/1970), a method in which an aromatic amine compound is coated (Japanese Unexamined Patent Publication (KOKAI) No. 50887/1976), and a method in which a reaction product of a phenolic compound with an aromatic aldehyde is coated (Japanese Unexamined Patent Publication (KOKAI) No. 54317/1980).

These are effective in preventing polymer scales from sticking, when vinyl halide monomers such as vinyl chloride or monomer mixtures mainly comprised of said vinyl halide monomers and containing a small amount of monomers copolymerizable therewith are polymerized.

However, in instances in which the monomers to be polymerized comprise other monomers having an ethylenically double bond such as styrene, alphamethylstyrene, acrylate and acrylonitrile, these monomers have so large a dissolving power against coatings formed by the above sticking-preventing methods that part or the whole of the coatings may be dissolved away, so that it becomes impossible to effectively prevent polymer scales from sticking on the inner wall, etc. of a polymerization vessel.

SUMMARY OF THE INVENTION

Now, an object of this invention is to provide a method that can effectively prevent polymer scales from sticking in the polymerization of not only the vinyl halide monomer but also intensive monomers having an ethylenically double bond.

The present inventors have discovered that the above object can be achieved by coating two groups of specific compounds taking two steps, on the inner wall and other parts with which a monomer comes into contact, of a polymerization vessel.

Thus, this invention provides a method of preventing polymer scales from sticking in a polymerization vessel during the polymerization of a monomer having an ethylenically double bond, wherein said polymerization is carried out in a polymerization vessel of which the inner wall and other parts with which said monomer comes into contact during polymerization are previously first coated with (a) a coating solution comprising a cationic dye [hereinafter called Coating Solution (a)] and the resulting coating is then coated with (b) a coating solution comprising at least one component selected from the group consisting of anionic polymeric compounds, amphoteric polymeric compounds and hydroxyl group-containing organic compounds [hereinafter called Coating Solution (b)].

According to this invention, it is possible to effectively prevent polymer scales from sticking on the inner wall, etc. of a polymerization vessel in the polymerization of monomers having an ethylenically double bond, which has been hitherto difficult. In particular, it is possible to prevent polymers from sticking as scales even in the polymerization in a polymerization system containing a monomer having a high dissolving power as exemplified by styrene, alpha-methylstyrene, acrylate and acrylonitrile. The coating may be carried out for every batch or once in several batches, so that the polymerization vessel can be repeatedly used without causing the polymers to stick.

DETAILED DESCRIPTION OF THE INVENTION

The cationic dye contained in Coating Solution (a) used in this invention may include, for example, azine dyes such as C.I. Basic Red 2, C.I. Basic Blue 16, C.I. Basic Black 2 and C.I. Solvent Black 5 or 7, acridine dyes such as C.I. Basic Orange 14 or 15, triphenylmethane dyes such as C.I. Basic Blue 1, 5, 7 or 26 and C.I. Basic Violet 3 or 14, thiazine dyes such as C.I. Basic Blue 9, 24 or 25, C.I. Basic Yellow 1 and C.I. Basic Green 5, methine dyes such as C.I. Basic Red 12 and C.I. Basic Yellow 11, diphenyl- or triphenylmethane dyes such as C.I. Basic Yellow 2, C.I. Solvent Violet 8, C.I. Solvent Blue 2 or 73, oxazine dyes such as C.I. Basic Blue 6 or 12, azo dyes such as C.I. Solvent Yellow 2, 6, 14, 15, 16, 19, 21 or 56, C.I. Solvent Red 1, 8, 23, 24, 25, 27, 100, 109 or 121, C.I. Solvent Brown 3, 5, 20 or 37, C.I. Solvent Black 3, 22 or 23, C.I. Basic Orange 2 and C.I. Basic Brown 1; xanthene dyes such as C.I. Basic Violet 10 and C.I. Basic Red 1; phthalocyanine dyes such as C.I. Solvent Blue 55; and anthraquinone dyes such as C.I. Solvent Blue 11, 12 or 36, C.I. Solvent Violet 1, 13 or 14 C.I. Disperse Violet and C.I. Solvent Green 3.

Among the above cationic dyes, preferred are C.I. Solvent Black 5 and 7.

Coating Solution (b) used in this invention must comprise at least one component selected from anionic polymeric compounds, amphoteric polymeric compounds and hydroxyl group-containing organic compounds.

The anionic polymeric compounds which may be used as a component of Coating Solution (b) include, for example, anionic polymeric compounds having a carboxyl group or sulfonic acid group as its side chain as exemplified by sulfomethylated compounds of polyacrylamide, polyacrylic acid, alginic acid, an acrylamide/vinylsulfonic acid copolymer, polymethacrylic acid and polystyrene sulfonic acid, or alkali metal salts or ammonium salts of these, and carboxymethyl cellulose.

Among the above anionic polymeric compounds, preferrd are polyacrylic acid and sodium salt of carboxymethyl cellulose.

The amphoteric polymeric compounds which may be used as a component of Coating Solution (b) include, for example, glue, gelatin, casein, and albumin. Of these, gelatin is preferred.

The hydroxyl group-containing organic compounds which may be used as a component of Coating Solution (b) include, for example, phenols and their derivatives, naphthalene derivatives, anthracene derivatives, phenanthrene derivatives, hydroxynaphthoquinones and related compounds, anthraquinone derivatives, heterocyclic compounds containing a hydroxyl group, aliphatic oxyacids such as tartaric acid, lactic acid and malic acid, and aliphatic alcohols such as glycerin.

The phenol derivatives include, for example, catechol, resorcin, phloroglucinol, Gallein, phloroglucide, phloroacetoanilide, hydroquinone, bisphenol A, butylhydroxyanisole, p-tert-butylcathechol, p-hydroxyanisole, 2,5-di-tert-butylhydroquinone, pyrogallol, pyrogallol-1-methylether, pyrogallol-2-methyl ether, pyrogallol-1,3-dimethyl ether, p-hydroxydiphenyl, octadecyl-3-(3,5-di-tert-butyl-4-hydroxyphenyl) propionate, dibutylhydroxytoluene, phenol-2-sulfonic acid, phenol-3-sulfonic acid, phenol-4-sufonic acid, phenol-2,4-disulfonic acid, phenol-2,5-disulfonic acid, phenol-2,4,6-trisulfonic acid, resorcin-4-sulfonic acid, 2-aminophenol-4-sulfonic acid, 4-hydroxydiphenylamine, p-hydroxypropiophenone, 2,3-dihydroxyacetophenone, 2,4-dihydroxyacetophenone, 2-hydroxy-4-methoxyacetophenone, 2,5-dihydroxyacetophenone, 2,6-dihydroxyacetophenone, 3,4-dihydroxyacetophenone, 4-hydroxy-3-methoxyacetophenone, 3,5-dihydroxyacetophenone, dihydroxypropiophenone, dihydroxymethylacetophenone, 2,3,4-trihydroxyacetophenone, 2,4,5-trihydroxyacetophenone, 2,4,6-trihydroxyacetophenone, 3,4,5-trihydroxyacetophenone, 2,6-dihydroxy-4-methylbenzoic acid, o-hydroxybenzoic acid, m-hydroxybenzoic acid, p-hydroxybenzoic acid, 2,3-dihydroxybenzoic acid, 3,5-dihydroxybenzoic acid, 2,4-dihydroxybenzoic acid, 2,5-dihydroxybenzoic acid, 3,4-methylene dioxybenzoic acid, 3,4,5-trihydroxybenzoic acid (gallic acid), 2,3,4-trihydroxybenzoic acid, 2,4,6-trihydroxybenzoic acid, 2,4,5-trihydroxybenzoic acid, 3-hydroxy-2-methylbenzoic acid, 4,6-dihydroxy-2-methylbenzoic acid, gallotannin, 3-methylsalycylic acid, 4-methylsalicylic acid, 5-methylsalicylic acid, 3-hydroxyphthalic acid, 4-hydroxyphthalic anhydride, 3,6-dihydroxyphthalic acid, 5-hydroxy-3-methylphthalic acid, 3,4-dihydroxyphthalic acid, 4,5-dihydroxyphthalic acid, 3,4,5-trihydroxyphthalic acid, 2-hydroxyisophthalic acid, 4-hydroxyisophthalic acid, 5-hydroxyislphthalic acid, 4,6-dihydroxyisophthalic acid, 4,5-dihydroxyisophthalic acid, 2,4,6-trihydroxyisophthalic acid, 4,5,6-trihydroxyisophthalic acid, hydroxyterephthalic acid, 2,5-dihydroxyterephthalic acid, 2,3-dihydroxyterephthalic acid, 3,5-dihydroxyterephthalic acid, 3-hydroxy-4-sulfobenzoic acid, 4-hydroxy-3-sulfobenzoic acid, 3-aminosalicylic acid, 4-aminosalicylic acid, 5-aminosalicylic acid, 2-hydroxydiphenylmethane, 4-hydroxydiphenylmethane, 2,4-dihydroxydiphenylmethane, 2,4'-dihydroxydiphenylmethane, 4,4'-dihydroxydiphenylmethane, 2-hydroxytoluene-4-sulfonic acid, 2-hydroxytoluene-5-sulfonic acid, 4-hydroxytoluene-6-sulfonic acid, 4-hydroxytoluene-2-sulfonic acid, 4-hydroxytoluene-3-sulfonic acid, 3-hydroxytoluene-4-sulfonic acid, 3-hydroxytoluene-6-sulfonic acid, pyrocatechin-4-sulfonic acid, 1-hydroxy-2-methoxybenzene-4-sulfonic acid, resorcin-4,6-disulfonic acid, 1,2,3-trihydroxybenzene-4-sulfonic acid, 1,3,4-trihydroxybenzene-5-sulfonic acid, 1,2-dihydroxybenzene-3,5-disulfonic acid, hydroquinone sulfonic acid, hydroquinone-2,5-disulfonic acid, N-phenylhydroxylamine, N-nitrosophenylhydroxylamine, N-benzene sulfonyl-N-phenylhydroxylamine, tolylhydroxylamine, N-formyl-N-phenylhydroxylamine, 2-amino-2-hydroxytoluene, 4-amino-2-hydroxytoluene, 5-amino-2-hydroxytoluene, 2-amino-3-hydroxytoluene, 4-amino-3-hydroxytoluene, 6-amino-3-hydroxytoluene, 2-amino-4-hydoxytoluene, 3-amino-4-hydroxytoluene, 3-aminocatechol, 4-aminocatechol, 2-aminohydroquinone, o-hydroxyaminobenzoic acid, m-hydroxyaminobenzoic acid, p-hydroxyaminobenzoic acid, 2-hydroxyaminoterephthalic acid, 5-hydroxyaminoterephthalic acid, 3-aminoguaiacol, 6-aminoguaiacol, 4-aminoguaiacol, 5-aminoguaiacol, 3-aminoveratrol, 4-aminoveratrol, 2-aminoresorcin, 4-aminoresorcin, 5-aminoresorcin, 2,4-diaminophenol, 2,5-diaminophenol, 4,5-diaminophenol, 3,4-diaminophenol, 2,6-diaminophenol, 3,5-diaminophenol, 2,4-diaminoanisole, 4,6-diaminoresorcin, phenylhydroxylamine-3-sulfonic acid, 4-hydroxyaminotoluene-2-sulfonic acid, p-hydroxyphenylhydrazine, 2,5-dihydroxy-p-benzoquinone and tetrahydroxybenzoquinone.

The naphthalene derivatives include, for example, alpha-naphthol, beta-naphthol, 1,2-dihydroxynaphthalene, 1,3-dihydroxynaphthalene, 1,4-dihydroxynaphtalerie, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, 2,7-dihydroxynaphthalene, 1,2,3-trihydroxynaphthalene, 1,2,4-trihydroxynaphthalene, 1,4,5-trihydroxynaphthalene, 1,2,3,4-tetrahydroxynaphthalene, 1,4,5,8-tetrahydroxynaphthalene, 1,2,3,4,5,8-hexahydroxynaphthalene, 1,2,3,4,5,10-hexahydroxynaphthalene, 1,2,3,4,9,10-hexahydroxynaphthalene, 1,2,4-aminonaphthol sulfonic acid, 3,4-dihydroxynaphthalene-1,2-dicarboxylic acid, 4-mercapto-1-naphthol, 1-naphthol-4-sufonic acid, 2-naphthol-1-sulfonic acid, 2-naphthol-8-sulfonic acid, 2-naphthol-6-sulfonic acid, 2-naphthol-6,8-disulfonic acid, 2-naphthol-3,6-disulfonic acid, 2-naphthol-3,6,8-trisulfonic acid 2-naphthol-1,3,6-trisulfonic acid, 2-hydroxy-1-naphthaldehyde, 4-hydroxy-1-naphthaldehyde, 5-hydroxy-1-naphthaldehyde, 1-hydroxy-2-naphthaldehyde, 3-hydroxy-2-naphthaldehyde, 4-hydroxy-2-naphthaldehyde, 6-hydroxy-2-naphthaldehyde, 2,3-dihydroxy-1-naphthaldehyde, 2,4-dihydroxy-1-naphthaldehyde, 2,5-dihydroxy-1-naphthaldehyde, 2,6-dihydroxy-1-naphthaldehyde, 2,7-dihydroxy-1-naphthaldehyde, 2,8-dihydroxy-1-naphthaldehyde, 3,4-dihydroxy-1-naphthaldehyde, 4,5-dihydroxy-1-naphthaldehyde, 4,6-dihydroxy-1-naphthaldehyde, 4,7-dihydroxy-1-naphthaldehyde, 4,8-dihydroxy-1-naphthaldehyde, 1,4-dihydroxy-2-naphthaldehyde, 1,5-dihydroxy-2-naphthaldehyde, 2-hydroxy-1-naphthoic acid, 3-hydroxy-1-naphthoic acid, 4-hydroxy-1-naphthoic acid, 5-hydroxy-1-naphthoic acid, 7-hydroxy-1-naphthoic acid, 1-hydroxy-2-naphthoic acid, 3-hydroxy-2-naphthoic acid, 3-hydroxy-2-naphthoic anilide, 1-acetyl-2-hydroxynaphthalene, 1-acetyl-4-hydroxynaphthalene, 2-acetyl-1-hydroxynaphthalene, 2-acetyl-4-hydroxynaphthalene, 2-acetyl-6-hydroxynaphthalene, 1-hydroxy-2-propionylnaphthalene, 1-benzoyl-2-hydroxynaphthalene and 1-benzoyl-4-hydroxynaphthalene.

The anthracene derivatives include, for example, 1-hydroxyanthracene, 2-hydroxyanthracene, 9-hydroxyanthracene, 1,2-dihydroxyanthracene, 1,4-dihydroxyanthracene, 1,5-dihydroxyanthracene, 1,8-dihydroxyanthracene, 2,3-dihydroxyanthracene, 2,6-dihydroxyanthracene, 2,7-dihydroxyanthracene, 1,9-dihydroxyanthracene, 9,10-dihydroxyanthracene and 10-benzoylanthranol.

The phenanthrene derivatives include, for example, 1-hydroxyphenanthracene, 2-hydroxyphenanthrene, 3-hydroxyphenanthrene, 4-hydroxyphenanthrene, 7-hydroxyphenanthrene, 9-hydroxyphenanthrene, 10-chloro-9-phenanthrol, 10-bromo-9-phenathrol, 9-nitro-3-phenanthrol, 4-amino-1-phenanthrol, 1-amino-2-phenanthrol, 4-amino-3-phenanthrol, 10-amino-9-phenanthrol, 10-benzeneazo-9-phenanthrol, 1,2-dihydroxyphenanthrene, 1,4-dihydroxyphenanthrene, 1,6-dihydroxyphenanthrene, 1,7-dihydroxyphenanthrene, 2,3-dihydroxyphenanthrene, 2,5-dihydroxyphenanthrene, 2,6-dihydroxyphenanthrene, 2,7-dihydroxyphenanthrene, 3,4-dihydroxyphenanthrene, 3,6-dihydroxyphenanthrene, 3,10-dihydroxyphenanthrene, 9,10-dihydroxyphenanthrene, 2,3,5,6-tetrahydroxyphenanthrene, 2-hydroxyphenanthrene-1,4-quinone, 3-hydroxyphenanthrene-1,4-quinone, 1-hydroxyphenanthrene-9,10-quinone, 2-hydroxyphenanthrene-9,10-quinone, 3-hydroxyphenanthrenequinone, 4-hydroxyphenanthrenequinone, 2-hydroxyretenequinone, 3-hydroxyretenequinone, 6-hydroxyretenequinone, 2-hydroxy-3,4-dinitrophenanthrenequinone, 4-hydroxy-2,3-dinitrophenanthrenequinone, 4-amino-1-hydroxyphenanthrenequinone, 2-amino-3-hydroxyphenanthrenequinone, 1-nitroso-1-naphthol 2-nitroso-1-naphthol and 4-nitroso-1-naphthol.

The hydroxynaphthoquinones and relates compounds include, for example, 3-hydroxy-1,2-naphthoquinone, 4-hydroxy-1,2-naphthoquinone, 5-hydroxy-1,2-naphthoquinone, 6-hydroxy-1,4-naphthoquinone, 6-hydroxy-1,2-naphthoquinone, 7-hydroxy-1,2-naphthoquinone, 2-hydroxy-1,4-naphthoquinone, 2,3-dihydroxy-1,4-naphthoquinone, 2,3-dihydroxy-6-methyl-1,4-naphthoquinone, 2,6-dihydroxy-1,4-naphthoquinone, 2,5-dihydroxy-3-methyl-1,4-naphthoquinone, 2,7-dihydroxy-1,4-naphthoquinone, 2,8-dihydroxy-3-methyl-1,4-naphthoquinone, 2,5-dihydroxy-1,4-naphthoquinone, 5,8-dihydroxy-2-methyl-1,4-naphthoquinone, 2,8-dihydroxy-1,4-naphthoquinone, 5,6-dihydroxy-1,4-naphthoquinone, 5,8-dihydroxy-1,4-naphthoquinone, 6,7-dihydroxy-1,4-naphthoquinone, 2,3,6-trihydroxy-1,4-naphthoquinone, 2,5,8-trihydroxy-3-methyl-1,4-naphthoquinone, 2,5,8-trihydroxy-1,4-naphthoquinone, 2,3,5,8-tetrahydroxy-1,4-naphthoquinone and 2,3,6,8-tetrahydroxy-1,4-naphthoquinone.

The anthraquinone derivatives include, for example, 1-hydroxanthraquinone, 2-hydroxyanthraquinone, 1,2-dihydroxyanthraquinone, 1,3-dihydroxyanthraquinone, 1,4-dihydroxyanthraquinone, 1,5-dihydroxyanthraquinone, 1,6-dihydroxyanthraquinone, 1,7-dihydroxyanthraquinone, 1,8-dihydroxyanthraquinone, 2,3-dihydroxyanthraquinone, 2,6-dihydroxyanthraquinone, 2,7-dihydroxyanthraquinone, 1,2,3-trihydroxyanthraquinone, 1,2,4-trihydroxyanthraquinone, 1,2,5-trihydroxyanthraquinone, 1,2,6-trihydroxyanthraquinone, 1,2,7-trihydroxyanthraquinone, 1,2,8-trihydroxyanthraquinone, 1,4,5-trihydroxyanthraquinone, 1,4,6-trihydroxyanthraquinone, 1,2,3,4-tetrahydroxyanthraquinone, 1,2,4,6-tetrahydroxyanthraquinone, 1,2,5,6-tetrahydroxyanthraquinone, 1,2,5,8-tetrahydroxyanthraquinone, 1,2,6,7-tetrahydroxyanthraquinone, 1,2,7,8-tetrahydroxyanthraquinone, 1,3,5,7-tetrahydroxyanthraquinone, 1,4,5,8-tetrahydroxyanthraquinone, 1,2,3,5,7-pentahydroxyanthraquinone.

The hydroxyl group-containing heterocyclic compounds include oxygen-containing compounds, for example, anthocyanins such as pelargonidin, cyanidine, delphinidine, paeonidin, malvidin, hirsutidin, monardaein and apigenin, coumarones such as sakuranetin, poncirin, neohesperidin, fustin, caranine, taxifolin and ampeloptin, catechins such as catechin, epicatechin, gallocatechin, epigallocatechin and epiafzelechin, xanthones such as mangiferin, lichexanthone and revenelin, xanthenes such as alpha-orcinophthalene, uranin, eosine and erythrosine; nitrogen-containing heterocyclic compounds, for example, indoles such as dihydroxyindole, 3-indolylglycerol and 3-methyl-5,6-dihydroxyindole; and sulfur-containing heterocyclic compounds, for example, thiophenes such as 2,3-dihydroxythiophene and 3-hydroxy-4-thiophene carboxylic acid and thianaphthenes such as 3-hydroxy-2-thianaphthenic acid.

Among the above hydroxy group-containing organic compounds, preferred are gallotannin and catechol.

In a preferred embodiment of this invention, Coating Solution (a) further comprises at least one component selected from the group consisting of anionic dyes, metal salts and inorganic colloids. This embodiment can achieve the scale preventing effect more effectively.

The anionic dye which may be used as a component of Coating Solution (a) includes, for example, C.I. Acid Yellow 38, C.I. Acid Red 18, 52, 73, 80 or 87, C.I. Acid Violet 11 or 78, C.I. Acid Blue 1, 40, 59, 113, 116, 120 or 158, C.I. Acid Orange 3 or 7, C.I. Acid Black 1, 2 or 124, C.I. Direct Orange 2, 10, 26 or 97, C.I. Direct Red 1, 31, 92 or 186, C.I. Direct Violet 1 or 22, C.I. Direct Blue 1, 6, 71, 86 or 106, C.I. Direct Black 2, 19, 32, 38 or 77, C.I. Direct Green 1, or 26, C.I. Direct Yellow 1, C.I. Direct Brown 1, 37 or 101, C.I. Food Yellow 3, C.I. Reactive Yellow 3, C.I. Reactive Blue 2, 4 or 18, C.I. Mordant Violet 5, C.I. Mordant Black 5, C.I. Mordant Yellow 26, C.I. Fluorescent Brightening Agent 30 or 32, C.I. Solubilized Vat Black 1 and C.I. Azoic Brown 2. These may be used singly or in combination of two or more. Of these, preferred is C.I. Acid Black 2.

Where the anionic dye is used as a component of Coating Solution (a), generally the solution contains the anionic dye and the cationic dye in a weight ratio of preferably from 100/0.1 to 100/1000, more preferably from 100/3 to 100/250. An excessively small weight ratio of the anionic dye/the cationic dye results in the coagulation and precipitation of the dyes in Coating Solution (a), so that uniform coating can be formed with difficulty. An excessively large weight ratio may result in a coating which may be readily dissolved away when washed with water, if the coating solution is dried after coated on the inner wall, etc. of the polymerization vessel.

The metal salts which may be used as a component of Coating Solution (a) include, for example, silicates, carbonates, phosphates, sulfates, nitrates, borates, acetates, hydroxides, oxides and halides of metals such as alkaline metals such as sodium and potassium, alkaline earth metals such as magnesium, calcium and barium, aluminum family metals such as aluminum, tin family metals such as titanium and tin, iron family metals such as iron and nickel, chromium family metals such as chromium and molybdenum, manganese family metals such as manganese, copper family metals such as copper and silver, platinum family metals such as platinum. And the inorganic colloids which may be used as a component of Coating Solution (a) include, for example, inorganic colloids prepared by mechanical crushing, irradiation with ultrasonic wave, electrical dispersion or chemical methods, such as gold colloid, silver colloid, sulfur colloids, colloid of ferric hydroxide, colloid of stannic acid, colloid of silicic acid, colloid of manganese dioxide, colloid of molybdenum oxide, colloid of barium sulfate, colloid of vanadium pentoxide, colloid of aluminum hydroxide, colloid of lithium silicate and so on.

Among the above metal salts and inorganic colloids, preferred are colloid of ferric hydroxide and colloid of alminum hydroxide.

Where the metal salt and/or the inorganic colloid are/is used as a component of Coating Solution (a), generally, the weight ratio (the cationic dye)/(at least one component selected from the group consisting of the metal salts and the inorganic colloids) is preferably in a range of from 100/0.1 to 100/500, more preferably in a range of from 100/5 to 100/200. An weight ratio within the above range can enhance the adhesion of the resulting coating to the inner wall, etc. of the polymerization vessel. There is no limitation on the total concentration of the components described above so long as it can achieve the coating weight as described velow, but, generally, it is preferably in a range of from about 0.001 to 5% by weight in a dried state. In general, the coating thus obtained preferably has a coating weight of from 0.001 to 5 g/m$^2$.

In one of the most preferable embodiments, Coating Solution (a) comprises an anionic dye and at least one component selected from the group consisting of metal salts and inorganic colloids, in combination with the cationic dye. According to this embodiment, the scale preventing effect can be achieved much more effectively.

In the method of this invention, to form a coating to prevent polymer scales from sticking on the inner wall, etc. of a polymerization vessel, Coating Solution (a) is first coated on the inner wall of a polymerization vessel and other parts with which the monomer comes into contact during polymerization, as exemplified by a stirring shaft and stirring blades. Coating Solution (a) may be prepared by dissolving or dispersing the cationic dye, optionally, together with any of other components described above in a suitable solvent in a concentration of about 0.001 to 5% by weight, and applying the resulting Coating Solution (a) on the inner wall, etc., followed by drying at room temperature to a temperature of about 100° C. The solvents used for preparation of Coating Solution (a) include, for example, water and solvents which can be readily mixed with water, such as alcohol solvents such as methanol, ethanol and n-propanol; ketone solvents such as acetone and methyl ethyl ketone; ester solvents such as methyl formate and methyl acetate; and non-protonic solvents such as dimethylformamide, dimethyl sulfoxide and acetonitrile, aliphatic hydrocarbon solvents such as n-hexane and n-pentane; aromatic hydrocarbon solvents such as toluene and xylene; halogenated hydrocarbon solvents such as 1,1,1-trichloroethylene and 1,1,1,2-tetrachloroethylene; and ether slovents such as tetrahydrofran and 1,4-dioxane, these of which are appropriately used alone or as a mixed solvent of two or more kinds.

Next, on the coating thus formed of Coating Solution (a), Coating Solution (b) is coated. This coating operation may comprise, for example, preparing a Coating Solution (b) by dissolving one or more components described above in a suitable solvent in a concentration of about 0.001 to 5.0% by weight, and applying the resulting Coating Solution (b) on the surface of the coating of Coating Solution (a), followed by drying at room temperature to a temperature of about 100° C. It is required to form the coating by sufficient drying. When coating operation is carried out, the temperature (coating temperature) of the inner wall etc. of the polymerization vessel are preferably kept at room temperature to about 100° C.

The solvents used for preparation of Coating Solution (b) include, for example, water, and organic solvents capable of being readily mixed with water as exemplified by alcohol solvents such as methanol, ethanol and n-propanol, ester solvents such as methyl formate and ethyl acetate, ketone solvents such as acetone and methyl ethyl ketone, ether solvents such as tetrahydrofran and 1,4-dioxane, and non-protonic solvents such as dimethylformamide, dimethyl sulfoxide and acetonitrile, these of which are appropriately used alone or as a mixed solvent of two or more kinds. In general, the coating thus obtained of Coating Solution (b) may preferably have a coating weight of from 0.001 to 5 g/m$^2$ in a dried state.

After the coating treatments of the inner wall of a polymerization vessel and other parts with which the monomer comes into contact during polymerization have been completed in this manner, a monomer having an ethylenically double bond, a polymerization initiator, and, optionally, a polymerization medium and other necessary additives as exemplified by a dispersing agent for the monomer may be charged in the polymerization vessel according to conventional procedures to carry out polymerization.

The monomer having an ethylenically double bond to which the method of this invention can be applied may include, for example, vinyl halides such as vinyl chloride; vinyl esters such as vinyl acetate and vinyl propionate; acrylic acid and methacrylic acid, or ester or salts of these; maleic acid or fumaric acid, and esters or anhydrides thereof; and diene monomers such as butadiene, chloroprene and isoprene; as well as styrene, acrylonitrile, halogenated vinylidene, and vinyl ethers.

There are no particular limitations on the form of the polymerization to which the method of this invention can be applied, and the invention is effective in any forms of polymerization such as suspension polymerization, polymerization.

Accordingly, any additive materials being added in a polymerization system that are commonly used can be used without any limitation. More specifically, the method of this invention can effectively prevent polymers from sticking, even in polymerization systems in which such additives are present as exemplified by suspension agents such as partially saponified vinyl alcohol, methyl cellulose and polyacrylate, solid dispersants such as calcium phosphate and hydroxyapatite, anionic emulsifying agents such as sodium lauryl sulfate, sodium dodecylbenzenesulfonate and sodium dioctylsulfosuccinate, nonionic emulsifying agents such as sorbitan monolaurate and polyoxyethylene alkylether, fillers such as calcium carbonate and titanium oxide, stabilizers such as tribasic lead sulfate, calcium stearate, dibutylin laurate and dibutyltin mercaptide, lubricants such as rice wax and stearic acid, plasticizers such as DOP and DBP, chain transfer agents such as trichloroethylene and mercaptans, pH adjusters, and polymerization catalysts such as diisopropyl peroxydicarbonate, alpha,alpha'-azobis-2,4-dimethylvaleronitrile, lauroyl peroxide, potassium persulfate, cumene hydroperoxide and p-menthane hydroperoxide.

The polymerization for which the method of this invention can be particularly suitably carried out include, for example, suspension polymerization or emulsion polymerization of vinyl halides such as vinyl chloride or vinylidene halides or a monomer mixture mainly comprised of any of these. The method is also suited to the polymerization in preparing beads or latexes of polymers such as polystyrene, polymethyl methacrylate and polyacrylonitrile, preparing synthetic rubbers such as SBR, NBR, CR, IR and IIR (these synthetic rubbers are commonly prepared by emulsion polymerization), and preparing ABS resins, in a polymerization vessel made of stainless steel.

EXAMPLES

The method of this invention will now be described by way of Examples and Comparative Examples. In the following description, Coating Solution A's and Coating Solution B's are specific examples of Coating Solution (a) and Coating Solution (b) described above, respectively. In each Table shown below, the experiment numbers marked with an asterisk denote comparative examples, and the other experiment numbers working examples of this invention.

EXAMPLE 1

Using a polymerization vessel made of stainless steel, having an inner capacity of 1,000 liter and equipped with a stirrer, polymerization was carried out in the following manner.

In each experiment, first a cationic dye was dissolved in methanol in a concentration of 0.5% by weight to prepare a coating solution [Coating Solution A], which was coated on the inner wall of the polymerization vessel and parts with which the monomer comes into contact during polymerization. The coating formed was left to stand at room temperature for 30 minutes, and washed with water after dried. Next, an anionic polymeric compound or amphoteric polymeric compound was dissolved in water to prepare a coating solution [Coating Solution B], which was coated, and the coating formed was dried and then washed with water. Provided that the coating solution was not coated or only one of Coating Solutions A and B was coated in Experiment No. 1 to No. 3. The cationic dye and anionic or amphoteric polymeric compound used in each experiment, as well as concentration and conditions for coating and drying of Coating Solution B, are shown in Table 1.

Thereafter, into the polymerization vessel coated in this way, 400 kg of water, 260 kg of a styrene monomer, 140 kg of an acrylonitrile monomer, 400 g of a partially saponified product of polyacrylamide and 1.2 kg of alpha,alpha'-azobizisobutylonitrile were charged to carry out polymerization at 90° C. for 5 hours with stirring. The amount of polymers sticked as scales on the inner wall of the polymerization vessel was measured. Results obtained are shown in Table 1.

TABLE 1

| Experiment No. | Coating Solution A Cationic dye | Coating Solution B Anionic or amphoteric polymeric compound | | | | Scale sticking (g/m$^2$) |
|---|---|---|---|---|---|---|
| | | Type | Conc. (wt. %) | Coating temp. (°C.) | Drying (min) | |
| *1 | — | — | | | | 1,200 |
| *2 | C.I. Solvent Black 5 | — | | | | 900 |
| *3 | — | Gelatin | 1.0 | 50 | 15 | 820 |
| 4 | C.I. Solvent Black 5 | Gelatin | 1.0 | 50 | 15 | 0 |
| 5 | C.I. Solvent Black 5 | " | 0.1 | 50 | 15 | 0 |
| 6 | C.I. Solvent Black 5 | " | 0.01 | 50 | 15 | 5 |
| 7 | C.I. Solvent Black 5 | " | 0.001 | 50 | 15 | 90 |
| 8 | C.I. Solvent Black 5 | " | 1.0 | 50 | 200 | 3 |
| 9 | C.I. Basic Orange 14 | Arginic acid | 1.0 | 50 | 15 | 0 |
| 10 | C.I. Basic Blue 9 | Polyacrylic acid | 1.0 | 50 | 15 | 5 |
| 11 | C.I. Solvent Red 24 | Carboxymethyl cellulose | 1.0 | 50 | 15 | 11 |
| 12 | C.I. Solvent Green 3 | Polystyrene sulfonic acid | 1.0 | 50 | 15 | 17 |
| *13 | C.I. Solvent Black 5 | Polyvinyl alcohol | 1.0 | 50 | 15 | 600 |

EXAMPLE 2

On a polymerization vessel made of stainless steel, having an inner capacity of 100 lit. and equipped with a stirrer, Coating Solution A was coated in the same manner as in Example 1, and thereafter Coating Solution B was coated. Provided that no coating solution was coated or only one of Coating Solutions A and B was coated in Experiment No. 14 to No. 16. The cationic dye and anionic or amphoteric polymeric compound used in each experiment, as well as concentration and conditions for coating and drying of Coating Solution B, are shown in Table 2.

Next, into the polymerization vessel treated in this way, 40 kg of water, 500 g of sodium oleate, 13 kg of polybutadiene latex (solid content: 45%), 9.0 kg of a styrene monomer, 5.0 kg of an acrylonitrile monomer, 40 g of t-dodecylmercaptan and 140 g of cumene hydroperoxide were charged, and, after the internal temperature was raised to 65° C., 200 g of glucose, 2 g of ferrous sulfate and 100 g of sodium pyrophosphate were charged to thereafter carry out polymerization at 65° C. for 5 hours with stirring. The amount of polymers sticked as scales on the inner wall of the polymerization vessel was measured. Results obtained are shown in Table 2.

ization vessel and parts with which the monomer comes into contact during polymerization. The coating formed was left to stand at 50° C. for 15 minutes, and then dried, followed by washing. Provided that Experiment No. 20 to No. 25 are comparative examples in which no coating solution was coated or only one of Coating Solutions (a) and (b) was coated as indicated in the table. Next, an anionic polymeric compound or amphoteric polymeric compound was dissolved in water to prepare a coating solution [Coating Solution (b)], which was coated, and the coating formed was dried and then washed with water. The cationic dye, metal salt or inorganic colloid, and anonic or amphoteric polymeric compound, as well as concentration and conditions for coating and drying of Coating Solution (b) used in each experiment, are shown in Table 3.

TABLE 2

| Experiment No. | Coating Solution A Cationic dye | Coating Solution B Anionic or amphoteric polymeric compound | | | | Scale sticking (g/m²) |
|---|---|---|---|---|---|---|
| | | Type | Conc. (wt. %) | Coating temp. (°C.) | Drying (min) | |
| *14 | — | — | | | | 600 |
| *15 | C.I. Solvent Black 7 | — | | | | 560 |
| *16 | — | Gelatin | 0.5 | 50 | 15 | 520 |
| 17 | C.I. Solvent Black 7 | Gelatin | 0.5 | 50 | 15 | 2 |
| 18 | C.I. Solvent Red 23 | Carboxymethyl cellulose | 1.5 | 80 | 15 | 0 |
| 19 | C.I. Basic Orange 14 | Polyacrylic acid | 0.5 | 60 | 15 | 5 |

EXAMPLE 3

Using a polymerization vessel made of stainless steel, having an inner capacity of 1,000 liter and equipped with a stirrer, polymerization was carried out in the following manner.

In each experiment, first a cationic dye was dissolved in methanol in a concentration of 0.5% by weight and a metal salt or a inorganic colloid was added thereto so that the weight ratio the cationic dye/(the metal salt or the inorganic colloid) might be the value as indicated in Table 5, to prepare a coating solution [Coating Solution (a)], which was coated on the inner wall of the polymer- Thereafter, into the polymerization vessel coated in this way, 400 kg of water, 260 kg of a styrene monomer, 140 kg of an acrylonitrile monomer, 400 g of a partially saponified product of polyacrylamide and 1.2 kg of alpha,alpha'-azobisisobutylonitrile were charged to carry out polymerization at 90° C. for 5 hours with stirring. The amount of polymers sticked as scales on the inner wall of the polymerization vessel was measured. Results obtained are shown in Table 3.

TABLE 3

| Exp. No. | Coating Solution A | | (1)/(2) Weight ratio | Coating Solution B Anionic amphoteric polymeric compound | | Coating temp. (°C.) | Drying (min) | Scale sticking (g/m²) |
|---|---|---|---|---|---|---|---|---|
| | (1) Cationic dye | (2) Metal salt or inorganic colloid | | Type | Conc. (wt. %) | | | |
| *20 | — | — | — | — | — | — | — | 1200 |
| *21 | C.I. Solvent Black 5 | — | — | — | — | — | — | 900 |
| *22 | — | — | — | Gelatin | 1.0 | 50 | 15 | 850 |
| *23 | — | Colloid of ferric hydroxide | 0/100 | — | — | — | — | 1000 |
| *24 | — | Colloid of ferric hydroxide | 0/100 | Gelatin | 1.0 | 50 | 15 | 800 |
| *25 | C.I. Solvent Black 5 | Colloid of ferric hydroxide | 100/50 | — | — | — | — | 50 |
| 26 | C.I. Solvent Black 5 | Colloid of ferric hydroxide | 100/65 | Gelatin | 0.5 | 50 | 15 | 0 |
| 27 | C.I. Solvent Black 5 | Colloid of ferric hydroxide | 100/65 | " | 0.001 | 50 | 15 | 0 |
| 28 | C.I. Solvent Black 5 | Colloid of aluminum hydroxide | 100/50 | " | 0.5 | 50 | 15 | 0 |
| 29 | C.I. Solvent Black 5 | Aluminum chloride | 100/25 | " | 0.5 | 50 | 15 | 0 |
| 30 | C.I. Basic Red 2 | Sulfur colloid | 100/100 | Arginic acid | 1.0 | 60 | 20 | 2 |

TABLE 3-continued

| | Coating Solution A | | | Coating Solution B | | | | |
|---|---|---|---|---|---|---|---|---|
| | | (2) Metal salt or | (1)/(2) | Anionic amphoteric polymeric compound | | Coating | Drying | Scale sticking |
| Exp. No. | (1) Cationic dye | inorganic colloid | Weight ratio | Type | Conc. (wt. %) | temp. (°C.) | (min) | (g/m²) |
| 31 | C.I. Solvent Black 7 | Colloid of ferric hydroxide | 100/100 | Gelatin | 0.5 | 50 | 15 | 0 |
| 32 | C.I. Basic Blue 9 | Ferric chloride | 100/5 | Albumin | 1.0 | 50 | 15 | 1 |
| 33 | C.I. Solvent Black 3 | Aluminum sulfate | 100/10 | Polystyrene Sulfonic acid | 0.5 | 50 | 15 | 0 |
| 34 | C.I. Solvent Red 24 | Colloid of Stannic acid | 100/50 | Carboxymethylcellulose | 1.0 | 50 | 15 | 0 |
| 35 | C.I. Basic Orange 15 | Titanium tetrachloride | 100/10 | Polyacrylic acid | 1.0 | 50 | 15 | 1 |

EXAMPLE 4

On a polymerization vessel made of stainless steel, having an inner capacity of 1,000 lit. and equipped with a stirrer, Coating Solution (a) was coated and thereafter Coating Solution (b) was coated in the same manner as in Example 3. Provided that Experiment No. 36 to No. 40 are comparative examples in which no coating solution was coated or only one of Coating Solutions (a) and (b) was coated. The cationic dye, metal salt or inorganic colloid, and anionic or amphoteric polymeric compound, as well as concentration and conditions for coating and drying of Coating Solution (b) used in each experiment, are shown in Table 3.

Thereafter, into the polymerization vessel treated in this way, 40 kg of water, 500 g of sodium oleate, 13 kg of polybutadiene latex (solid content: 45%), 9.0 kg of a styrene, 5.0 kg of an acrylonitrile, 40 g of t-dodecylmercaptan and 140 g of cumene hydroperoxide were charged, and, after the internal temperature was raised to 65° C, 200 g of glucose, 2 g of ferrous sulfate and 100 g of sodium pyrophosphate were charged to thereafter carry out polymerization at 65° C. for 5 hours with stirring. The amount of polymer scales sticked on the inner wall of the polymerization vessel was measured.

TABLE 4

| | Coating Solution A | | | Coating Solution B | | | | |
|---|---|---|---|---|---|---|---|---|
| | | (2) Metal salt or | (1)/(2) | Anionic or amphoteric polymeric compound | | Coating | Drying | Scale sticking |
| Exp. No. | (1) Cationic dye | inorganic colloid | Weight ratio | Type | Conc. (wt. %) | temp. (°C.) | (min) | (g/m²) |
| *36 | — | — | — | — | — | — | — | 600 |
| *37 | C.I. Basic Orange 14 | — | — | — | — | — | — | 590 |
| *38 | — | — | — | Gelatin | 0.5 | 50 | 15 | 520 |
| *39 | C.I. Basic Orange 14 | Colloid of ferric hydroxide | 100/50 | — | — | — | — | 100 |
| *40 | — | Colloid of ferric hydroxide | 0/100 | — | — | — | — | 500 |
| 41 | C.I. Basic Orange 14 | Colloid of ferric hydroxide | 100/50 | Gelatin | 0.5 | 50 | 15 | 0 |
| 42 | C.I. Solvent Red 23 | Colloid of aluminum hydroxide | 100/100 | Carboxymethylcellulose | 0.5 | 50 | 15 | 0 |
| 43 | C.I. Solvent Yellow 6 | Colloid of silicic acid | 100/100 | Sulfomethylated polyacrylamide | 1.0 | 80 | 15 | 1 |
| 44 | C.I. Solvent Blue 11 | Colloid of lithium silicate | 100/200 | Polymethacrylic acid | 0.5 | 50 | 20 | 2 |
| 45 | C.I. Solvent Green 3 | Colloid of vanadium pentoxide | 100/150 | Gelatin | 0.5 | 80 | 15 | 0 |
| 46 | C.I. Solvent Blue 55 | Aluminum hydrogenphosphate | 100/10 | " | 1.0 | 70 | 15 | 0 |
| 47 | C.I. Solvent Black 7 | Aluminum ammonium sulfate | 100/5 | Glue | 1.0 | 60 | 15 | 1 |

EXAMPLE 5

On the inner wall of the polymerization vessel made of stainless steel and the parts with which the monomer comes into contact, having an inner capacity of 1,000 lit. and equipped with a stirrer, Coating Solution (a) and (b) prepared in the Examples 3 or 4 were coated and the coating formed was dried at 50° C. for 15 minutes and then washed with water in the same manner as in Example 3. Coating Solution (a) and (b) in each experiment were the same as used in the experiment Nos. indicated in Table 5.

Polymerization was carried out by use of the polymerization vessel in which coating was formed on the inner wall and so on. After the completion of polymerization, the reaction product was taken out, and the inner of polymerization vessel was then washed with water. Again, the operations from coating the coating solutions to charging, polymerizing and washing with water were repeated in the same manner. The number of polymerization runs which could be repeated before the scale sticking amount exceeded 1 g/m² (Scale preventing number) was measured, and the measured number was taken as the measure of scale-sticking preventing effect. Results obtained are shown in Table 5.

TABLE 5

| Experiment No. | Coating Solution | Scale preventing Number |
|---|---|---|
| *48 | — | 0 |
| 49 | Experiment No. 26 | 50 |
| 50 | Experiment No. 27 | 45 |
| 51 | Experiment No. 29 | 40 |
| 52 | Experiment No. 34 | 20 |
| 53 | Experiment No. 41 | 25 |
| 54 | Experiment No. 45 | 18 |

EXAMPLE 6

Using a polymerization vessel made of stainless steel, having an inner capacity of 1,000 liter and equipped with a stirrer, polymerization was carried out in the following manner.

In each experiment, first a cationic dye was dissolved in methanol in a concentration of 0.5% by weight to prepare a coating solution [Coating Solution A], which was coated on the inner wall of the polymerization vessel and parts with which the monomer comes into contact during polymerization. The coating formed was left to stand at 50° C. for 15 minutes, and dried and then washed with water. Next, a hydroxyl group-containing organic compound was dissolved in methanol and water was added (the volume ratio water/methanol was 90/10) to prepare a coating solution [Coating Solution B], which was coated, and the coating formed was dried. Provided that no coating solution was coated or only one of Coating Solutions A and B was coated in Experiment No. 55 to No. 57. The cationic dye and hydroxyl group-containing organic compound used as well as concentration and conditions for coating and drying of Coating Solution B in each experiment, are shown in Table 6.

Thereafter, into the polymerization vessel coated in this way, 400 kg of water, 260 kg of styrene, 140 kg of acrylonitrile, 400 g of a partially saponified product of polyacrylamide and 1.2 kg of alpha,alpha'-azobisisobutylonitrile were charged to carry out polymerization at 90° C. for 5 hours with stirring. The amount of polymer scales sticked on the inner wall of the polymerization vessel was measured. Results obtained are shown in Table 6.

TABLE 6

| Exp. No. | Coating Solution A Cationic dye | Coating Solution B hydroxyl group-containing organic compound Type | Conc. (wt. %) | Coating temp. (°C.) | Drying (min) | Scale sticking (g/m²) |
|---|---|---|---|---|---|---|
| *55 | — | — | — | — | — | 1200 |
| *56 | C.I. Solvent Black 5 | — | — | — | — | 900 |
| *57 | — | Catechol | 0.1 | 50 | 15 | 1000 |
| 58 | C.I. Solvent Black 5 | Catechol | 0.1 | 50 | 15 | 2 |
| 59 | C.I. Solvent Black 5 | Pyrogallol | 0.5 | 50 | 15 | 2 |
| 60 | C.I. Solvent Black 5 | 2,4-dihydroxybenzoic acid | 0.5 | 50 | 20 | 5 |
| 61 | C.I. Solvent Black 5 | 1,2-dihydroxy-anthracene | 0.25 | 50 | 15 | 10 |
| 62 | C.I. Solvent Black 5 | 1,2,5,8-tetrahydroxy-anthraquinone | 0.5 | 50 | 30 | 13 |
| 63 | C.I. Solvent Black 5 | Catechin | 0.25 | 50 | 15 | 2 |
| 64 | C.I. Solvent Yellow 2 | 3,6-dihydroxyphthalic acid | 0.25 | 50 | 15 | 10 |
| 65 | C.I. Solvent Red 23 | 1,2-dihydroxy-naphthalene | 0.25 | 50 | 15 | 7 |
| 66 | C.I. Solvent Black 3 | 1,2,3,4-tetrahydroxy-napththalene | 0.25 | 50 | 15 | 8 |
| 67 | C.I. Solvent Blue 55 | 2,5-dihydroxy-p-benzoquinone | 0.25 | 50 | 15 | 11 |
| 68 | C.I. Solvent Black 22 | Phloroglucin | 0.25 | 50 | 15 | 6 |

EXAMPLE 7

On a polymerization vessel made of stainless steel, having an inner capacity of 100 lit. and equipped with a stirrer, Coating Solution A was coated and thereafter Coating Solution B was coated in the same manner as in Example 6. Provided that no coating solution was coated or only one of Coating Solutions A and B was coated in Experiment No. 69 to No. 71. The cationic dye and hydroxyl group-containing organic compound used in each experiment, as well as concentration and conditions for coating and drying of Coating Solution B, are shown in Table 7.

Next, into the polymerization vessel treated in this way, 40 kg of water, 500 g of sodium oleate, 13 kg of polybutadiene latex (solid content: 45%), 9.0 kg of styrene, 5.0 kg of acrylonitrile, 40 g of t-dodecylmercaptan and 140 g of cumene hydroperoxide were charged, and, after the internal temperature was raised to 65° C., 200 g of glucose, 2 g of ferrous sulfate and 100 g of sodium pyrophosphate were charged to thereafter carry out polymerization at 65° C. for 5 hours with stirring. The amount of polymer scales sticked on the inner wall of the polymerization vessel was measured. Results obtained are shown in Table 7.

TABLE 7

| Exp. No. | Coating Solution A Cationic dye | Coating Solution B hydroxyl group-containing organic compound Type | Conc. (wt. %) | Coating temp. (°C.) | Drying (min) | Scale sticking (g/m²) |
| --- | --- | --- | --- | --- | --- | --- |
| *69 | — | — | — | — | — | 600 |
| *70 | C.I. Solvent Black 7 | — | — | — | — | 560 |
| *71 | — | Catechol | 0.5 | 50 | 15 | 570 |
| 72 | C.I. Solvent Black 7 | Catechol | 0.5 | 50 | 15 | 10 |
| 73 | C.I. Solvent Black 5 | Gallotannin | 1.0 | 50 | 20 | 1 |
| 74 | C.I. Solvent Brown 3 | p-hydroxyaminobenzoic acid | 0.1 | 50 | 15 | 5 |
| 75 | C.I. Solvent Yellow 21 | 1,4-dihydroxynaphthalene | 0.1 | 50 | 15 | 10 |
| 76 | C.I. Solvent Red 24 | 1,4-dihydroxy-antraquinone | 0.1 | 50 | 15 | 12 |

EXAMPLE 8

Using a polymerization vessel made of stainless steel, having an inner capacity of 1,000 liter and equipped with a stirrer, polymerization was carried out in the following manner.

In each experiment, first a cationic dye and anionic dye were dissolved in a mixed solvent of water and methanol (the volume ratio of water/methanol: 90/10) so that the total concentration of the cationic dye and anionic dye might be 0.5% by weight to prepare a coating solution [Coating Solution (a)], which was coated on the inner wall of the polymerization vessel and parts with which the monomer comes into contact during polymerization. The coating formed was left to stand at 60° C. for 15 minutes, and washed with water after dried. Next, a hydroxyl group-containing organic compound was dissolved in methanol and water was added thereto (the volume ratio of water/methanol: 80/20) to prepare a coating solution [Coating Solution (b)], which was coated, and the coating formed was dried and then washed with water. Provided that no coating solution was coated or only one of Coating Solutions (a) and (b) was coated or only Coating Solution (a) containing either one of the cationic dye and the anionic dye was coated in Experiment No. 77 to No. 80. The anionic dye, cationic dye and hydroxyl group-containing organic compound, as well as concentration and conditions for coating and drying of Coating Solution (b), are shown in Table 8.

Thereafter, into the polymerization vessel coated in this way, 400 kg of water, 260 kg of a styrene monomer, 140 kg of an acrylonitrile monomer, 400 g of a partially saponified product of polyacrylamide and 1.2 kg of alpha,alpha'-azobisisobutylonitrile were charged to carry out polymerization at 90° C. for 5 hours with stirring. The amount of polymer scales sticked on the inner wall of the polymerization vessel was measured. Results obtained are shown in Table 8.

TABLE 8

| Exp. No. | Coating Solution A (1) Anionic dye | (2) Cationic dye | (1)/(2) Weight ratio | Coating Solution B hydroxyl group-containing organic compound Type | Conc. (wt. %) | Coating temp. (°C.) | Drying (min) | Scale sticking (g/m²) |
| --- | --- | --- | --- | --- | --- | --- | --- | --- |
| *77 | — | — | — | — | — | — | — | 1200 |
| *78 | C.I. Acid Black 2 | — | 100/100 | — | — | — | — | 800 |
| *79 | — | C.I. Solvent Black 3 | 0/100 | — | — | — | — | 900 |
| *80 | — | — | — | Catechol | 0.5 | 50 | 15 | 1000 |
| 81 | C.I. Acid Black 2 | C.I. Solvent Black 5 | 100/40 | Catechol | 0.5 | 50 | 15 | 0 |
| 82 | C.I. Acid Black 2 | C.I. Basic Orange 14 | 100/20 | Pyrogallol | 0.5 | 50 | 15 | 1 |
| 83 | C.I. Acid Black 2 | C.I. Solvent Black 3 | 100/100 | Catechin | 0.3 | 60 | 15 | 1 |
| 84 | C.I. Direct Brown 1 | C.I. Basic Blue 24 | 100/50 | Phloroglucin | 0.5 | 70 | 10 | 2 |
| 85 | C.I. Acid Blue 59 | C.I. Basic Orange 15 | 100/30 | 1,2-dihydroxynaphthalene | 0.2 | 50 | 15 | 1 |
| 86 | C.I. Direct Blue 71 | C.I. Basic Blue 9 | 100/20 | Resorcin | 0.5 | 50 | 10 | 3 |
| 87 | C.I. Acid Black 2 | C.I. Basic Red 2 | 100/50 | Tetrahydroxybenzoquinone | 0.5 | 60 | 10 | 2 |
| 88 | C.I. Acid Red 52 | C.I. Solvent Yellow 2 | 100/20 | 1,2,5,8-tetrahydroxyanthraquinone | 0.2 | 60 | 15 | 5 |
| 89 | C.I. Acid Orange 3 | C.I. Solvent Black 23 | 100/200 | 2,3-dihydroxyanthraquinone | 0.4 | 70 | 10 | 4 |

TABLE 8-continued

| | Coating Solution A | | | Coating Solution B | | | | |
|---|---|---|---|---|---|---|---|---|
| | | | | hydroxyl group-containing organic compound | | Coating | Drying | Scale |
| Exp. No. | (1) Anionic dye | (2) Cationic dye | (1)/(2) Weight ratio | Type | Conc. (wt. %) | temp. (°C.) | (min) | sticking (g/m²) |
| 90 | C.I. Direct Red 79 | C.I. Basic Blue 6 | 100/100 | 2-hydroxy-naphthoic acid | 0.5 | 50 | 15 | 6 |

EXAMPLE 9

On a polymerization vessel made of stainless steel, having an inner capacity of 100 lit. and equipped with a stirrer, Coating Solution (a) was coated and thereafter Coating Solution (b) was coated in the same manner as in Example 8. Provided that no coating solution was coated or only one of Coating Solutions (a) and (b) was coated or only Coating Solution (a) containing either one of the cationic dye and the anionic dye was coated in Experiment No. 91 to No. 94. The anionic dye, cationic dye, the mixing ratio thereof and the hydroxyl group-containing organic compound, as well as concentration and conditions for coating and drying of Coating Solution (b) used in each experiment, are shown in Table 9.

Next, into the polymerization vessel treated in this way, 40 kg of water, 50 g of sodium oleate, 13 kg of polybutadiene latex (solid content: 45%), 9.0 kg of a styrene, 5.0 kg of an acrylonitrile, 40 g of t-dodecylmercaptan and 140 g of cumene hydroperoxide were charged, and, after the internal temperature was raised to 65° C., 200 g of glucose, 2 g of ferrous sulfate and 100 g of sodium pyrophosphate were charged to thereafter carry out polymerization at 65° C. for 5 hours with stirring. The amount of polymer scales sticked on the inner wall of the polymerization vessel was measured. Results obtained are shown in Table 9.

EXAMPLE 10

In each experiment, on the inner wall and other parts with which a monomer comes into contact, of the polymerization vessel made of stainless steel having an inner capacity of 100 lit. and equipped with a stirrer, Coating Solution (a) which is the same as used in Exmeriment No. given in Table 10 of Examples 8 and 9, was coated and washed followed by drying. Subsequently, the coating solution prepared by dissolving the hydroxyl group-containing organic compound shown in Table 10 in water in the concentration of 0.5% by weight [Coating Solution (b)] was coated, and dried at 50° C. for 15 minutes. Provided that Coating Solutions (a) was not coated but only Coating Solution (b) was coated in Experiment No. 102.

Next, in the polymerization vessel treated in this way, polymerization was carried out in the same manner as in Example 8. After the completion of the polymerization, the amount of polymer scales sticked on the inner wall of the polymerization vessel was measured. Results obtained are shown in Table 10.

TABLE 10

| Exp. No. | Coating Solution A | hydroxyl group-containing organic compound in coating solution B | Scale sticking (g/m²) |
|---|---|---|---|
| *102 | — | Partially saponified | 1000 |

TABLE 9

| | Coating Solution A | | | Coating Solution B | | | | |
|---|---|---|---|---|---|---|---|---|
| | | | | hydroxyl group-containing organic compound | | Coating | Drying | Scale |
| Exp. No. | (1) Anionic dye | (2) Cationic dye | (1)/(2) Weight ratio | Type | Conc. (wt. %) | temp. (°C.) | (min) | sticking (g/m²) |
| *91 | — | — | — | — | — | — | — | 600 |
| *92 | C.I. Acid Black 2 | — | 100/0 | — | — | — | — | 580 |
| *93 | — | C.I. Solvent Black 7 | 0/100 | — | — | — | — | 560 |
| *94 | — | — | — | Pyrogallol | 0.5 | 50 | 15 | 590 |
| 95 | C.I. Acid Black 2 | C.I. Solvent Black 7 | 100/40 | Gallotannin | 0.5 | 60 | 15 | 0 |
| 96 | C.I. Acid Orange 7 | C.I. Solvent Blue 2 | 100/200 | 2,4-dihydroxy-benzoic acid | 0.5 | 50 | 20 | 1 |
| 97 | C.I. Direct Orange 26 | C.I. Basic Black 2 | 100/20 | Catechin | 0.5 | 50 | 15 | 2 |
| 98 | C.I. Acid Black 124 | C.I. Solvent Black 5 | 100/100 | Pyrogallol | 0.5 | 50 | 15 | 3 |
| 99 | C.I. Acid Red 87 | C.I. basic Green 5 | 100/40 | 1,5-dihydroxy-anthracene | 0.2 | 60 | 15 | 2 |
| 100 | C.I. Direct Violet 22 | C.I. Solvent Violet 1 | 100/80 | 1,2-dihydroxy-naphthalene | 0.4 | 50 | 15 | 1 |
| 101 | C.I. Acid Yellow 38 | C.I. Basic Blue 6 | 100/20 | 1,8-dihydroxy-naphthalene | 0.5 | 60 | 15 | 5 |

TABLE 10-continued

| Exp. No. | Coating Solution A | hydroxyl group-containing organic compound in coating solution B | Scale sticking (g/m$^2$) |
|---|---|---|---|
| 103 | Experiment No. 81 | polyvinyl alcohol Phenollignin | 2 |
| 104 | Experiment No. 83 | Methyl cellulose | 3 |
| 105 | Experiment No. 87 | Polyvinyl alcohol | 7 |
| 106 | Experiment No. 89 | Alginic acid | 14 |
| 107 | Experiment No. 95 | Chitin | 2 |
| 108 | Experiment No. 100 | Pectic acid | 10 |

EXAMPLE 11

Using a polymerization vessel made of stainless steel, having an inner capacity of 1,000 liter and equipped with a stirrer, polymerization was carried out in the following manner.

In each experiment, first an anionic dye and cationic dye was dissolved in methanol in a concentration of 0.5% by weight and a metal salt or a inorganic colloid was added thereto so that the weight ratio (the metal salt or the inorganic colloid)/(the anionic dye and the cationic dye) might be the value as indicated in Table 11, to prepare a coating solution [Coating Solution (a)], which was coated on the inner wall of the polymerization vessel and parts with which the monomer comes into contact during polymerization. The coating formed was left to stand at 50° C. for 20 minutes, and then dried, followed by washing. Next, an anionic polymeric compound or amphoteric polymeric compound was dissolved in water to prepare a coating solution [Coating Solution (b)], which was coated, and the coating formed was dried at 60° C. for 15 minutes and then washed with water. Provided that Experiment No. 109 to No. 113 are comparative examples in which no coating solution was coated or only one of Coating Solutions (a) and (b) was coated as indicated in the table. (1) the anionic dye, (2) the cationic dye, (3) metal salt or inorganic colloid, and anionic or amphoteric polymeric compound, as well as the weight ratio (1)/(2), the weight ratio (3)/[(1)+(2)] and the concentration of Coating Solution (b) used in each experiment, are shown in Table 11.

Thereafter, into the polymerization vessel coated in this way, 400 kg of water, 260 kg of a styrene monomer, 140 kg of an acrylonitrile monomer, 400 g of a partially saponified product of polyacrylamide and 1.2 kg of alpha,alpha'-azobisisobutylonitrile were charged to carry out polymerization at 90° C. for 5 hours with stirring. The amount of polymer scales sticked on the inner wall of the polymerization vessel was measured. Results obtained are shown in Table 11.

TABLE 11

| | Coating Solution A | | | | | Coating Solution B | | |
|---|---|---|---|---|---|---|---|---|
| | (1) | (2) | (1)/(2) | (3) Metal Salt | (3)/(1) + (2) | Anionic or amphoteric polymeric compound | | Scale |
| Exp. No. | Anionic dye | Cationic dye | Weight ratio | or inorganic colloid | Weight ratio | Type | Conc. (wt. %) | sticking (g/m$^2$) |
| *109 | — | — | — | — | — | — | — | 1200 |
| *110 | C.I. Acid Black 2 | — | 100/0 | — | — | — | — | 800 |
| *111 | — | C.I. Solvent Black 3 | 0/100 | — | — | — | — | 900 |
| *112 | — | — | — | Colloid of silicic acid | 100/0 | — | — | 800 |
| *113 | — | — | — | — | — | Gelatin | 1.0 | 850 |
| 114 | C.I. Acid Black 2 | C.I. Solvent Black 5 | 100/40 | Colloid of silicic acid | 30/100 | Gelatin | 0.5 | 0 |
| 115 | C.I. Acid Black 2 | C.I. Basic Orange 14 | 100/25 | Colloid of silicic acid | 40/100 | Polyacrylic acid | 0.5 | 0 |
| 116 | C.I. Acid Black 2 | C.I. Solvent Black 3 | 100/100 | Colloid of silicic acid | 20/100 | Gelatin | 0.5 | 0 |
| 117 | C.I. Acid Blue 59 | C.I. Basic Blue 6 | 100/200 | Colloid of silicic acid | 10/100 | Gelatin | 0.5 | 0 |
| 118 | C.I. Acid Red 52 | C.I. Basic Red 2 | 100/40 | Ferric chloride | 5/100 | Carboxymethylcellulose | 0.5 | 1 |
| 119 | C.I. Acid Orange 3 | C.I. Solvent Black 23 | 100/200 | Aluminum sulfate | 5/100 | Albumin | 0.3 | 1 |
| 120 | C.I. Acid Blue 40 | C.I. Basic Blue 6 | 100/25 | Colloid of silicic acid | 100/100 | Gelatin | 0.5 | 1 |
| 121 | C.I. Direct Black 19 | C.I. Solvent Blue 55 | 100/100 | Aluminum hydroxide | 5/100 | Arginic acid | 0.2 | 1 |
| 122 | C.I. Direct Blue 71 | C.I. Solvent Blue 2 | 100/150 | Colloid of ferric hydroxide | 5/100 | Glue | 0.5 | 0 |

EXAMPLE 12

On a polymerization vessel made of stainless steel, having an inner capacity of 1,000 lit. and equipped with a stirrer, Coating Solution (a) was coated and thereafter Coating Solution (b) was coated in the same manner as in Example 11. Provided that Experiment No. 125 to No. 129 are comparative examples in which no coating solution was coated or only one of Coating Solutions (a) and (b) was coated. (1) the anionic dye, (2) the cationic dye, (3) metal salt or inorganic colloid, and anionic or amphoteric polymeric compound, as well as the weight ratio (1)/(2), the weight ratio (3)/[(1)+(2)] and the concentration of Coating Solution (b) used in each experiment, are shown in Table 12.

Thereafter, into the polymerization vessel treated in this way, 40 kg of water, 500 g of sodiumoleate, 13 kg of polybutadiene latex (solid content: 45%), 9.0 kg of a styrene, 5.0 kg of an acrylonitrile, 40 g of t-dodecylmercaptan and 140 g of cumene hydroperoxide were charged, and, after the internal temperature was raised to 65° C., 200 g of glucose, 2 g of ferrous sulfate and 100 g of sodium pyrophosphate were charged to thereafter carry out polymerization at 65° C. for 5 hours with stirring. The amount of polymer scales sticked on the inner wall of the polymerization vessel was measured. The results are given in Table 12.

TABLE 12

| | Coating Solution A | | | | | Coating Solution B | | |
|---|---|---|---|---|---|---|---|---|
| | (1) | (2) | (1)/(2) | (3) Metal Salt | (3)/(1) + (2) | Anionic or amphoteric polymeric compound | | Scale sticking $(g/m^2)$ |
| Exp. No. | Anionic dye | Cationic dye | Weight ratio | or inorganic colloid | Weight ratio | Type | Conc. (wt. %) | |
| *123 | — | — | — | — | — | — | — | 600 |
| *124 | C.I. Acid Black 2 | — | 100/0 | — | — | — | — | 580 |
| *125 | — | C.I. Solvent Black 7 | 0/100 | — | — | — | — | 560 |
| *126 | — | — | — | Ferric hydroxide sol | 100/0 | — | — | 590 |
| *127 | — | — | — | — | — | Gelatin | 1.0 | 510 |
| 128 | C.I. Acid Black 2 | C.I. Solvent Black 7 | 100/35 | Colloid of silicic acid | 40/100 | gelatin | 1.0 | 0 |
| 129 | C.I. Acid Orange 7 | C.I. Solvent Blue 2 | 100/150 | Colloid of silicic acid | 20/100 | Gelatin | 0.5 | 0 |
| 130 | C.I. Direct Orange 26 | C.I. Basic Black 2 | 100/25 | Colloid of silicic acid | 30/100 | Polystyrene sulfonic acid | 0.5 | 1 |
| 131 | C.I. Acid Violet 22 | C.I. Solvent Violet 1 | 100/100 | Colloid of ferric hydroxide | 15/100 | Polymethacrylic acid | 1.0 | 0 |
| 132 | C.I. Acid Red 87 | C.I. Basic Yellow 2 | 100/40 | Aluminum chloride | 5/100 | Carboxymethylcellulose | 0.2 | 1 |
| 133 | C.I. Direct Brown 1 | C.I. Solvent Black 22 | 100/200 | Colloid of aluminum hydroxide | 30/100 | Gelatin | 0.5 | 0 |
| 134 | C.I. Direct Green 26 | C.I. Basic Green 5 | 100/15 | Colloid of aluminum hydroxide | 15/100 | Gelatin | 0.5 | 1 |
| 135 | C.I. Acid Black 124 | C.I. Basic Orange 15 | 100/30 | Colloid of silicic acid | 100/100 | Glue | 0.5 | 1 |
| 136 | C.I. Direct Orange 7 | C.I. Basic Red 2 | 100/25 | Colloid of lithium silicate | 100/100 | Gelatin | 0.5 | 1 |

EXAMPLE 13

On the inner wall of the polymerization vessel made of stainless steel and the parts with which the monomer comes into contact, having an inner capacity of 1,000 lit. and equipped with a stirrer, Coating Solution (a) and (b) prepared in the Examples 11 or 12 were coated and the coating formed was dried at 50° C. for 15 minutes and then washed with water in the same manner as in Example 11. Coating Solution (a) and (b) in each experiment were the same as used in the experiment Nos. indicated in Table 13. Provided that Experiment No. 137 is a comparative example in which no coating was carried out.

Polymerization was carried out by use of the polymerization vessel in which coating was formed on the iner wall and so on. After the completion of polymerization, the reaction product was taken out, and the inner of polymerization vessel was then washed with water. Again, the operations from coating the coating solutions to charging, polymerizing and washing with water were repeated in the same manner. The number of polymerization runs which could be repeated before the scale sticking amount exceeded 1 $g/m^2$ (Scale preventing number) was measured, and the measured number was taken as the measured of scale-sticking preventing effect. Results obtained are shown in Table 13.

TABLE 13

| Experiment No. | Coating Solution | Scale preventing Number |
|---|---|---|
| *137 | | 0 |
| 138 | Experiment No. 114 | 60 |
| 139 | Experiment No. 115 | 50 |
| 140 | Experiment No. 116 | 65 |
| 141 | Experiment No. 128 | 45 |
| 142 | Experiment No. 133 | 25 |

We claim:

1. A method of preventing polymer scales from sticking in a polymerization vessel during polymerization of a monomer having an ethylenically unsaturated bond, which comprises carrying out said polymerization in a polymerization vessel of which the inner wall and other parts with which the monomer comes into contact with during polymerization are previously first coated with:
   (a) a coating solution comprising a cationic dye, followed by drying, and the resulting coating is then coated with:
   (b) a coating solution, consisting essentially of at least one component selected from the group consisting of anionic polymeric compounds, amphoteric polymeric compounds and hydroxyl group-containing organic compounds in a solvent, followed by drying.

2. The method of claim 1, wherein said cationic dye consist of C.I. Solvent Black 5 or 7.

3. The method of claim 1, wherein said coating solution (b) contains polyacrylic acid, sodium salt of carboxymethyl cellulose, gelatin, gallotannin or catechol in the solvent.

4. The method of claim 1, wherein said coating solution (a) further comprises at least one component selected from the group consisting of metal salts, inorganic colloids and anionic dyes.

5. The method of claim 4, wherein said coating solution (a) comprises colloid of ferric hydroxide or colloid of aluminum hydroxide.

6. The method of claim 4, wherein said coating solution (a) comprises an anionic dye.

7. The method of claim 6, wherein said anionic acid comprises, C.I. Acid Black 2.

8. The method of claim 6, wherein the weight ratio said anionic dye/said cationic dye in the solution na) is from 100/0.1 to 100/1,000.

9. The method of claim 4, said coating solution (a) comprises an anionic dye and at least one component selected from the group consisting of metal salts and inorganic colloids.

* * * * *